US008957765B2

(12) United States Patent
Guo et al.

(10) Patent No.: US 8,957,765 B2
(45) Date of Patent: Feb. 17, 2015

(54) ELECTRONIC DEVICE AND METHOD FOR OPERATING SAME

(75) Inventors: Xiaobing Guo, Beijing (CN); Yi Xiao, Beijing (CN); Wei Xie, Beijing (CN); Dengfeng Wu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 184 days.

(21) Appl. No.: 13/814,910

(22) PCT Filed: Aug. 24, 2011

(86) PCT No.: PCT/CN2011/078816
§ 371 (c)(1), (2), (4) Date: Feb. 7, 2013

(87) PCT Pub. No.: WO2012/028066
PCT Pub. Date: Mar. 8, 2012

(65) Prior Publication Data
US 2013/0147613 A1 Jun. 13, 2013

(30) Foreign Application Priority Data
Aug. 30, 2010 (CN) .......................... 2010 1 0267984

(51) Int. Cl.
*G05B 11/01* (2006.01)
*G08C 19/16* (2006.01)
*G08C 17/00* (2006.01)

(52) U.S. Cl.
CPC ................ *G08C 19/16* (2013.01); *G08C 17/00* (2013.01)
USPC ... 340/12.54; 340/635; 340/936; 340/693.11; 455/3.05; 455/44; 455/45; 455/426.2

(58) Field of Classification Search
CPC ......... G08C 19/16; G06F 13/38; H02J 7/0044
USPC ......... 340/12.54, 635, 636, 693.11; 455/30.5, 455/44, 45, 426.2
See application file for complete search history.

(56) References Cited

U.S. PATENT DOCUMENTS 6,438,640 B1 * 8/2002 Miyamoto et al. ............ 710/303
6,724,975 B1 4/2004 Cheong et al.
(Continued)

FOREIGN PATENT DOCUMENTS

CN 1491039 4/2004
CN 1885928 12/2006
(Continued)

OTHER PUBLICATIONS

Office Action mailed on Aug. 2, 2012, Chinese Priority Application No. 201010267984.1, 6 pages.
(Continued)

*Primary Examiner* — Tai T Nguyen
(74) *Attorney, Agent, or Firm* — Dentons US LLP

(57) ABSTRACT

An electronic device (100) and method for operating the same. The electronic device (100) comprises at least two working modes and comprises a connection state acquisition unit (110) and a mode switching unit (12). The connection state acquisition unit (110) is used for acquiring the connection state between the electronic device (100) and a remote control unit, and the remote control unit is used for remotely controlling the electronic device (100). The mode switching unit (12) is used for switching the working mode of the electronic device (100) according to the connected state.

10 Claims, 3 Drawing Sheets

(56) References Cited

U.S. PATENT DOCUMENTS

| | | | | |
|---|---|---|---|---|
| 8,090,309 | B2 * | 1/2012 | Krampf et al. | 455/3.05 |
| 8,208,917 | B2 * | 6/2012 | Ueda | 455/426.2 |
| 2010/0052332 | A1 | 3/2010 | Pang et al. | |

FOREIGN PATENT DOCUMENTS

| | | |
|---|---|---|
| CN | 201360265 | 12/2009 |
| CN | 101646025 | 2/2010 |
| CN | 101661665 | 3/2010 |
| CN | 101808206 | 8/2010 |
| DE | 19500409 | 5/1996 |
| EP | 2187618 | 5/2010 |

OTHER PUBLICATIONS

English Translation of Office Action mailed on Aug. 2, 2012, Chinese Priority Application No. 201010267984.1, 5 pages.
English Abstract of Chinese Application No. 201360265 Y, 1 page.
English Specification of Chinese Application No. 201360265 Y, 6 pages.
English Abstract of Chinese Application No. 1491039 A, 1 page.
English Abstract of Chinese Application No. 101661665 A, 1 page.
Beijing Lenovo Software Ltd. et al.; PCT/CN2011/078816 filed Aug. 24, 2011; International Preliminary Report on Patentability; mailed Mar. 14, 2013; International Bureau of WIPO; 1 page.
Beijing Lenovo Software Ltd; PCT/CN2011/078816 filed Aug. 24, 2011; International Preliminary Report on Patentability English Translation; mailed Oct. 13, 2011; International Bureau of WIPO; 9 pages.
English Abstract of Chinese Application No. 1885928 A, 1 page.
English Abstract of Chinese Application No. 101646025 A, 2 pages.
English Abstract of Chinese Application No. 101808206, 1 page.
English Abstract of German Application No. 19500409 A1, 1 page.
Third Office Action mailed on Nov. 8, 2013, Chinese Priority Application No. 201010267984.1, 4 pages.
English Translation of Third Office Action mailed on Nov. 8, 2013, Chinese Priority Application No. 201010267984.1, 2 pages.

* cited by examiner

ELECTRONIC DEVICE AND METHOD FOR OPERATING SAME

CROSS REFERENCE TO RELATED APPLICATIONS

This application is a national phase application based on international application number PCT/CN2011/078816, filed Aug. 24, 2011, and claims priority of Chinese Patent Application No. 201010267984.1, filed Aug. 30, 2010, the contents of both disclosures are incorporated by reference herein in their entireties.

BACKGROUND

The present invention generally relates to an electronic apparatus and operating method thereof, and more particularly, it relates to an electronic apparatus comprising at least two kinds of working modes and operating method thereof.

Before the current electronic apparatus is controlled using a remote control device, such as a wireless remote controller, the electronic apparatus is firstly started-up to make the electronic apparatus in a state of receiving remote control of the remote control device. In general cases, the user needs to press the start-up key provided separately on the remote control device, so as to control the electronic apparatus to enter a working mode of receiving remote control, otherwise the user is not able to use the remote control device to control the electronic apparatus. This is inconvenient for the user.

Further, in the conventional technology, the electronic apparatus and the remote control device thereof are two components independent of each other, for example, the above-described electronic apparatus and wireless remote controller. This makes it difficult for the user to intuitively correspond the electronic apparatus with the remote control device for controlling the electronic apparatus, especially in the case that there is a plurality of electronic apparatus and a plurality of corresponding remote control devices, it is a troublesome matter for the user to find the remote control device for controlling the electronic apparatus that the user currently wants to use from many remote control devices.

Therefore, a design scheme of an electronic apparatus and remote control device thereof, which is able to overcome the defect existing in the conventional technology and provide more convenient service to the user, is needed.

SUMMARY

Described is an electronic apparatus and operating method thereof, the electronic apparatus switches between a plurality of working modes based on the connection relationship between it and a remote control unit thereof.

The above-described and/or other characteristics and advantages of the general concept of the embodiment of the present invention can be implemented by providing the electronic apparatus. The electronic apparatus comprises at least two kinds of working modes, and comprises a connection state acquiring unit for acquiring the connection state of the electronic apparatus with a remote control unit, wherein, the remote control unit is for remotely controlling the electronic apparatus, and a mode switching unit for switching the working modes of the electronic apparatus according to the connected state.

In some embodiments, the connection state acquiring unit is a connection state detecting unit for detecting the connection state of the electronic apparatus with the remote control unit.

In some embodiments, the connection state acquiring unit is a connection state receiving unit for receiving the connection state of the electronic apparatus with the remote control unit.

In some embodiments, the mode switching unit is for switching the working mode of the electronic apparatus to a first working mode when the connection state is a first connection state, and for switching the working mode of the electronic apparatus to a second working mode when the connection state is a second connection state.

In some embodiments, the connection state comprises at least one of the following: power connection on, power connection off, data connection on, data connection off, wire connection on, wire connection off, wireless connection on, and wireless connection off.

In some embodiments, the electronic apparatus further comprises a first display content generating unit for generating a display content related to the working mode of the electronic apparatus, and displaying the same through a displaying unit of the remote control unit.

In some embodiments, when the electronic apparatus is switched to the first working mode, the display content comprises a first display content related to the first working mode, when the electronic apparatus is switched to the second working mode, the display content comprises a second display content related to the second working mode.

In some embodiments, the display content comprises at least one of the system operation state information of the electronic apparatus, and the program run state information of the electronic apparatus.

In some embodiments, the electronic apparatus further comprises a charging unit for charging the remote control unit. When the electronic apparatus is switched to the first working mode, the charging unit charges the remote control unit. When the electronic apparatus is switched to the second working mode, the charging unit stops charging the remote control unit.

In some embodiments, the charging mode of the electronic apparatus to the remote control unit comprises one of the following: wire cable direct charging, magnetic interface charging, and wireless charging.

In some embodiments, the remote control unit comprises a display unit; a second display content generating unit for generating a display content related to the remote control unit; a charging interface for accepting the charging of the charging unit; and a communication unit for carrying out data communication with the electronic apparatus, wherein, the display unit displays at least one of the display content generated by the first display content generating unit and the display content generated by the second display content generating unit.

In some embodiments, the electronic apparatus comprises at least one of the following apparatus: computer, television set, set-top box, cable TV integrator, player, domestic server, and projector.

In some embodiments, the remote control unit comprises at least one of the following apparatus: dedicated remote controller and wireless mobile apparatus (mobile phone/intelligent terminal/portable terminal with remote controlling function).

The above-described and/or other characteristics and advantages of the general concept of the embodiments of the present invention can also be implemented by providing an operating method of the electronic apparatus. The method comprises steps of acquiring a connection state of the electronic apparatus with a remote control unit, wherein, the remote control unit is for remotely controlling the electronic apparatus, and switching the working mode of the electronic apparatus according to the connected state.

In some embodiments, the step of acquiring the connection state comprises detecting the connection state of the electronic apparatus with the remote control unit.

In some embodiments, the step of acquiring the connection state comprises receiving the connection state of the electronic apparatus with the remote control unit.

In some embodiments, the step of switching the working mode of the electronic apparatus according to the connection state comprises switching the working mode of the electronic apparatus to a first working mode when the connection state is a first connection state, and switching the working mode of the electronic apparatus to a second working mode when the connection state is a second connection state.

In some embodiments, the operating method further comprises generating a display content related to the working mode of the electronic apparatus, and sending the display content generated to the remote control unit, wherein, the display content is displayed through the display unit of the remote control unit.

In some embodiments, the operating method further comprises generating a first display content related to the first working mode when the working mode of the electronic apparatus is switched to the first working mode, and generating a second display content related to the second working mode when the working mode of the electronic apparatus is switched to the second working mode.

In some embodiments, the operating method further comprises generating the display content, including at least one of the system operation state information of the electronic apparatus and the program run state information of the electronic apparatus.

In some embodiments, the operating method further comprises charging the remote control unit when the electronic apparatus is switched to the first working mode. The remote control unit is stopped from being charged when the electronic apparatus is switched to the second working mode.

In some embodiments, the operating method further comprises generating a display content related to the remote control unit, and displaying at least one of the display content related to the working mode of the electronic apparatus, and the display content related to the remote control unit through the display unit of the remote control unit.

It should be understood that the technical solution according to the embodiment of the present invention is capable of comprising any combination of the aspects and features described here. That is, the technical solution according to the embodiment of the present invention is not limited to the combination of aspects and features specifically described in this disclosure, and it further comprises at least any combination of all available aspects and features. This is clear for those skilled in the art.

Details of one or more embodiments of the present invention are explained in the following explanation and accompanying drawings. The other aspects, features, purposes, and advantages of the present invention are clear from the following explanation, accompanying drawings, and claims.

BRIEF DESCRIPTION OF THE DRAWINGS

The above-described and/or other aspects and features of the general concept of the embodiments of the present invention would become more clear and easy-to-understand from the following description of the embodiment in combination with the accompanying drawings, wherein.

Identical or similar reference numbers always indicate identical or similar elements or constituent parts throughout the accompanying drawings.

DETAILED DESCRIPTION

The respective preferable embodiments of the present invention are described with reference to the accompanying drawings hereinafter. The description with reference to the accompanying drawings is provided hereinafter to help understand the exemplary embodiment of the present invention defined by the claims or the equivalence. It comprises various kinds of specific details in helping understanding, but they are only regarded as schematic. Therefore, those skilled in the art would recognize that the embodiment described here can be made various kinds of alternations and modifications without departing from the range and spirit of the present invention. Further, in order to make the specification more clear and brief, the detailed description on the well-known function and structure in the art would be omitted.

The electronic apparatus according to the embodiment of the present invention can be connected together with a remote control unit for controlling the electronic apparatus. Depending on the difference of the connection state between the electronic apparatus and the remote control unit, the connection between the electronic apparatus and the remote control unit can be classified as connection on state and connection off state. Such connection between the electronic apparatus and the remote control unit can adopt various kinds of connections, including but not limited to power connection, data connection, wire connection, wireless connection, and so on. Thus, in consideration of the case of the different connection types, the connection state of the electronic apparatus according to the embodiment of the present invention with the remote control unit may comprise, but not be limited to, power connection on, power connection off, data connection on, data connection off, wire connection on, wire connection off, wireless connection on, wireless connection off, and so on. It is noted that various kinds of other types of connections may be also used in the connection of the electronic apparatus according to the embodiment of the present invention with the remote control unit. The working modes of the electronic apparatus itself are switched according to the various kinds of connection states of the electronic apparatus with the remote control unit generated through the combination of different connection types and connection on/off states. According to some embodiments, when the connection state of the electronic apparatus with the remote control unit is a first connection state, the working mode of the electronic apparatus is switched to a first working mode, and when the connection state is a second connection state, the working mode of the electronic apparatus is switched to a second working mode. Wherein, the difference between the first working mode and the second working mode comprises the power consumptions of the electronic apparatus and the units operating in the electronic apparatus, etc.

Figure 1:
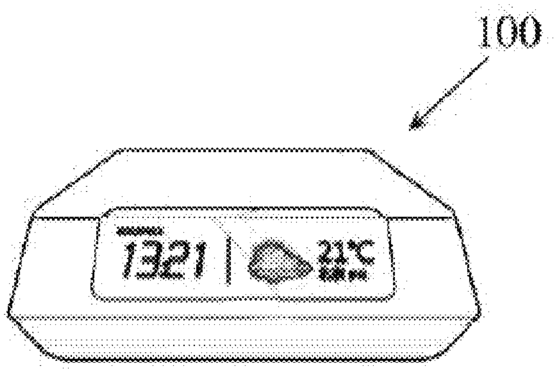
FIG. 1 is a schematic diagram illustrating the electronic apparatus according to the embodiment of the present invention when the electronic apparatus is in connection on state with the remote control unit.
Figure 2:
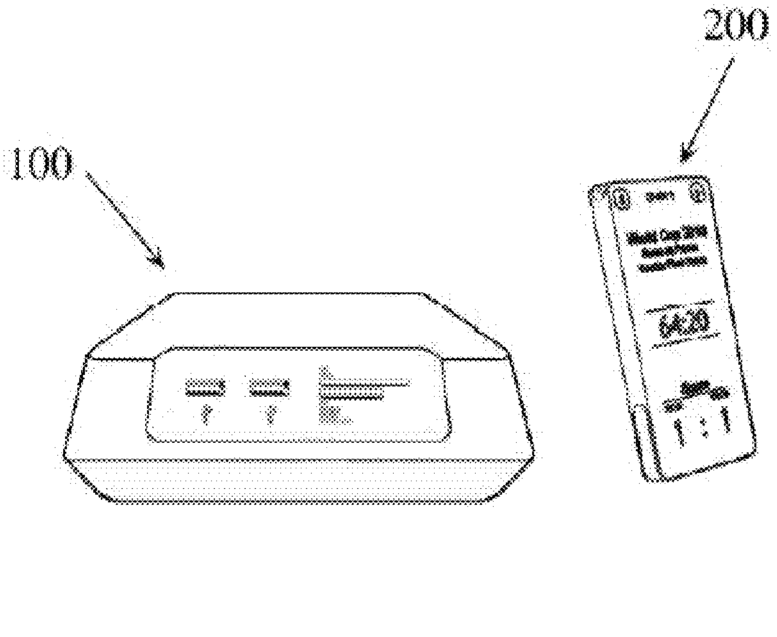
FIG. 2 is a schematic diagram illustrating the electronic apparatus according to the embodiment of the present invention when the electronic apparatus is in a connection off state with the remote control unit.

The change of the connection on state and connection off state of the electronic apparatus with the remote control unit according to the embodiment of the present invention is described by referring now to FIGS. 1 and 2. FIG. 1 is a schematic diagram illustrating the electronic apparatus according to the embodiment of the present invention when the electronic apparatus is in the connection on state with the remote control unit. FIG. 2 is a schematic diagram illustrating the electronic apparatus according to the embodiment of the present invention when the electronic apparatus is in the connection off state with the remote control unit.

As illustrated in FIG. 1, the connection state of the electronic apparatus with the remote control unit is connection on state. At this time, for example, the electronic apparatus is in a standby state. The electronic apparatus can acquire information on the connection state thereof with the remote control unit to change the working mode thereof correspondingly. As illustrated in FIG. 2, when the electronic apparatus acquires information that the connection state thereof with the remote control unit changes, i.e., when the connection state of the electronic apparatus with the remote control unit is changed from the connection on state to the connection off state, the electronic apparatus changes the working mode thereof correspondingly. Thus, for example, the electronic apparatus is changed from standby/sleep/power-down state to working state (wherein, the difference of two kinds of state is in that the power consumptions of the electronic apparatus are different). It is noted that the connection on/off state may mean any suitable connection type, for example, FIG. 1 illustrates the connection on state of wire connection, and FIG. 2 illustrates the connection off state of wire connection.

As aforementioned, the electronic apparatus according to the embodiment of the present invention can be switched between the corresponding various kinds of working modes according to the various kinds of different connection states of the electronic apparatus with the remote control unit. According to the difference of the connection types, various kinds of connection states may exist, and they correspond to the various kinds of working modes of the electronic apparatus, respectively. For example, the connection state of the electronic apparatus with the remote control unit includes but is not limited to power connection on, power connection off, data connection on, data connection off, wire connection on, wire connection off, wireless connection on, wireless connection off, and so on. The electronic apparatus according to the embodiment of the present invention is switched between different working modes according to, for example, the above-described connection state. For example, when the power connection is on, the electronic apparatus can carry out the working mode of such as charging the remote control unit or the like, and when the data connection is on, the electronic apparatus can carry out the working mode including the data communication with the remote control unit or the like.

Further, in practical application, the connection of the electronic apparatus with the remote control unit may have, for example, the connection characteristic of one or more connection states in the above-described connection states. For example, when the connection state between the electronic apparatus and the remote control unit is powered on, the electronic apparatus and the remote control unit may further both have a connection state of data connection on. That is, the connection state between the electronic apparatus and the remote control unit conform to both the power connection on state and the data connection on state. Therefore, the electronic apparatus can enable the functionality included in correspondingly one or more working modes according to the determined connection state. In particular, as aforementioned, when the connection state between the electronic apparatus and the remote control unit conforms to the power connection on state and the data connection on state at the same time, the electronic apparatus can correspondingly carry out the function of the working modes corresponding to both the power connection on state and the data connection on state. For example, while the electronic apparatus charges the remote control unit, it can keep the data communication with the remote control unit at the same time. This has a significant meaning in practical application, more convenient and efficient application examples can be acquired in practice by flexibly setting the relationship between the connection state of the electronic apparatus with the remote control unit and the corresponding working mode of the electronic apparatus.

It is noted that the embodiments of the present invention are not limited to the above embodiment, the connection state of the electronic apparatus with the remote control unit, and the working mode of the electronic apparatus exemplified thereby. Those skilled in the art can think out other connection states and corresponding working modes according to the teaching of the specification, and these implementation modes should belong to the range covered by the general concept of the embodiments of the present invention.

Figure 3:
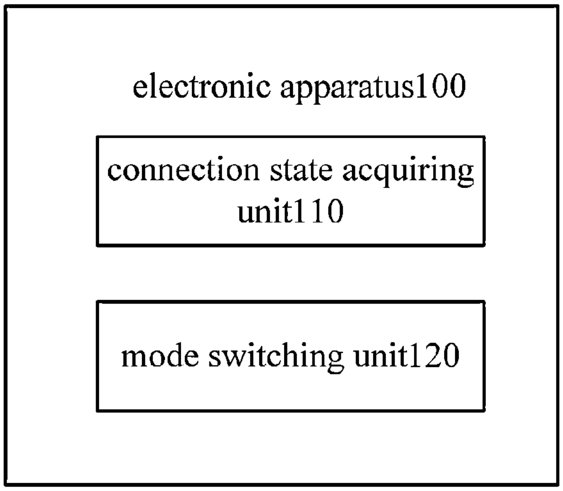
FIG. 3 is a block diagram illustrating the exemplary structure of the electronic apparatus according to the embodiment of the present invention.

The schematic structure of the electronic apparatus according to the embodiment of the present invention is described with reference to FIG. 3 now. FIG. 3 is a block diagram illustrating the exemplary structure of the electronic apparatus according to the embodiment of the present invention. As shown in FIG. 3, the electronic apparatus 100 comprises a connection state acquiring unit 110 and a mode switching unit 120. Wherein, the connection state acquiring unit 110 can be used to acquire the connection state of the electronic apparatus 100 with the remote control unit. Here, the connection state acquiring unit 110 can be a connection state detecting unit for detecting the connection state of the electronic apparatus 100 with the remote control unit and can also be a connection state receiving unit for receiving the connection state of the electronic apparatus 100 with the remote control unit.

As aforementioned, the electronic apparatus according to the embodiment of the present invention can be connected together with the remote control unit, such connection can use various kinds of connection modes, which include but are not limited to electric connection, optical connection, magnetic connection, mechanical connection, and so on. Therefore, when the connection state acquiring unit 110 is the connection state detecting unit, it can detect the connection state between the electronic apparatus 100 and the remote control unit using a corresponding sensor. For example, when the connection between the electronic apparatus 100 and the remote control unit adopts electric connection, it can detect, for example, whether the built-in USB signal from the remote control unit is on by the electronic sensor for detecting an electrical signal to determine the connection status. When the connection between the electronic apparatus 100 and the remote control unit adopts optical connection, for example through optic fiber, it can detect the block to the optical signal made when the remote control unit is connected to the electronic apparatus 100 by the optical sensor for detecting an optical signal to determine the connection state. When the connection between the electronic apparatus 100 and the remote control unit adopts magnetic connection, it can detect the magnetic force of the magnetic strip near the connection interface of the electronic apparatus 100 with the remote control unit by magnetic force sensor for detecting the magnetic force to determine the connection state, and when the connection between the electronic apparatus 100 and the remote control unit adopts mechanical connection, it can detect, for example, whether the mechanical connection structure between the electronic apparatus 100 and the remote control unit is triggered by the trigger sensor for detecting a trigger action to determine the connection state.

And when the connection state acquiring unit 110 is the connection state receiving unit, it can receive information on the connection state of the electronic apparatus 100 with the remote control unit from the exterior of the electronic apparatus 100. In some embodiments, the electronic apparatus 100 can receive the information on the connection state from the remote control unit. In such case, the remote control unit comprises a connection state detecting unit for detecting the connection state between the electronic apparatus 100 and the remote control unit. As aforementioned, the connection state detecting unit can use the corresponding sensor to detect the connection state between the electronic apparatus 100 and the remote control unit and notify the detection result from the remote control unit to the connection state receiving unit of the electronic apparatus 100. In other embodiments, the electronic apparatus 100 can acquire the information on the connection state from a third party (not shown) other than the electronic apparatus 100 and the remote control unit. In such case, the connection state detecting unit is in the third party, other than the electronic apparatus 100 and the remote control unit, it detects the connection state between the electronic apparatus 100 and the remote control unit using the above-described detect means, and then notifies the detection result to the connection state receiving unit of the electronic apparatus 100.

The mode switching unit 120 can be used to switch the working mode of the electronic apparatus 100 according to the connected state between the electronic apparatus 100 and the remote control unit. The correspondence between the connected state of the electronic apparatus 100 with the remote control unit and the working mode of the electronic apparatus 100 can be preset by the user, or set by the manufacturer when the electronic apparatus 100 is manufactured. And, the correspondence can be stored in the storing unit (not shown) of the electronic apparatus 100. Based on such correspondence, the mode switching unit 120 determines the working mode of the electronic apparatus 100 according to the connected state, and carries out the switch of the working mode. When the connection state of the electronic apparatus 100 with the remote control unit is a first connection state, the mode switching unit 120 switches the working mode of the electronic apparatus 100 to the corresponding first working mode, when the connection state is a second connection state, the mode switching unit 120 switches the working mode of the electronic apparatus 100 to the corresponding second working mode.

One exemplary embodiment of the present invention is described by taking electronic apparatus 100 as television set as an example, and at the same time FIGS. 1 and 2 are referred to again. In particular, when the connection state acquiring unit 110 acquires that the connection state between the television set and the remote control unit is a first connection state, for example, "power connection on, data connection on, wire connection on, wireless connection on"-state (hereinafter referred to as "on-state"), the mode switching unit 120 switches the television set to the first working mode, for example the standby mode, according to the connection state. And when the connection state acquiring unit 110 acquires that the connection state between the television set and the remote control unit is a second connection state, for example, "power connection off, data connection off, wire connection off, wireless connection off"-state (hereinafter referred to as "off-state"), the mode switching unit 120 switches the television set to a second working mode, for example the working mode, according to the connected state.

Figure 4:
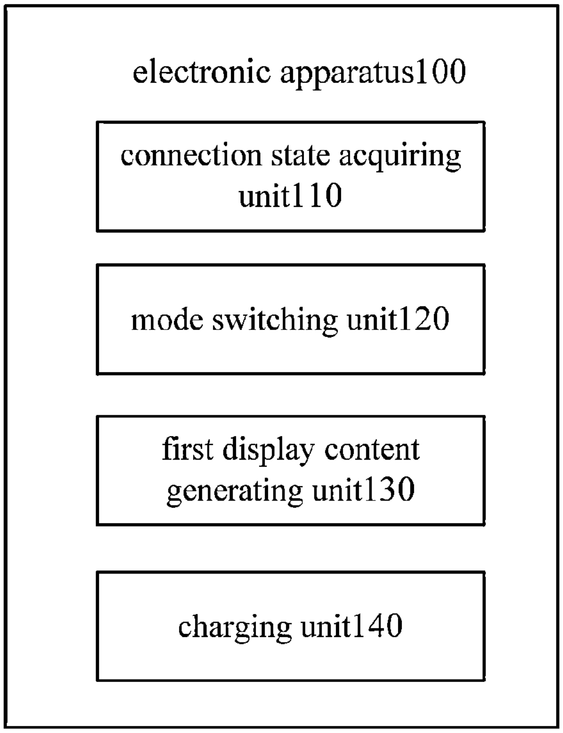
FIG. 4 is a block diagram illustrating the exemplary structure of the electronic apparatus according to another embodiment of the present invention.

The schematic structure of the electronic apparatus according to another embodiment of the present invention is described with reference to FIG. 4 now. FIG. 4 is a block diagram illustrating the example structure of the electronic apparatus according to another embodiment of the present invention. As shown in FIG. 4, the electronic apparatus 100 according to another embodiment of the present invention may also comprise a first display content generating unit 130 for generating a display content related to the working mode of the electronic apparatus 100, for example, system operation state information on the system operation state of the electronic apparatus 100, program run state information on the program running on the electronic apparatus 100, and so on. The system operation state information comprises the basic information of the electronic apparatus 100 and wholly presents the information including the function and Operating System of the electronic apparatus 100. For example, the apparatus name, the Operating System, the component type, the processing resource, and the working mode of the electronic apparatus 100, and so on. On the other hand, the program run state information means the information of the program running on the electronic apparatus 100, including the information of the local program and for example the information of the service program received via network. For example, time, background download state, as well as weather, pathway condition, background push-pull service, and so on. When the mode switching unit 120 switches the electronic apparatus 100 to the first working mode, the first display content generating unit 130 generates a first display content related to the first working mode, and when the mode switching unit 120 switches the electronic apparatus 100 to the second working mode, the first display content generating unit 130 generates a second display content related to the second working mode. The display content generated by the first display content generating unit 130 can be displayed by the display unit provided on the remote control unit.

With reference to FIGS. 1 and 2 again, it is schematically described by taking the electronic apparatus 100 as television set as an example. When the connection state acquiring unit 110 determines that the television set and the remote control unit are in on-state, the mode switching unit 120 switches the working mode of the television set to a standby state. At this time, the first display content generating unit 130 can generate a display content related to the standby state of the television set, for example including time display information and weather information or the like, and display by the display unit provided on the remote control unit, as illustrated in FIG. 1. In some embodiments, the display content generated can be transferred to the remote control unit through for example a wire connection interface, and displayed by the display unit after being processed by the remote control unit. Then, when the connection state acquiring unit 110 determines that the television set and the remote control unit are in off-state, the mode switching unit 120 switches the working mode of the television set to a working state. Thus, at the same time that the television set is on and displays TV program, the first display content generating unit 130 can generate a display content related to the working state of the television set, including for example information related to the TV program. For example, if the television set supports IPTV, the first display content generating unit 130 can generate a display content related to the electronic program guideline EPG, for example, component can be clicked directly when the user selects the program such as various kinds of menu, button, link or the like, or various kinds of dynamic or static multimedia content for being browsed by the user. When the TV program relates to a sport match, the first display content generating unit 130 can generate information related to the sport match, such as score, match time, and so on. Further, the first display content generating unit 130 can generate and display on the display unit of the remote control unit display content related to a channel selecting range, program forecast, program abstract or the like. These operations can be implemented by the interaction between the television set and the communication unit of the remote control unit, typically, the display content generated is transferred to the remote control unit by a wireless connection interface, and displayed by the display unit after being processed by the remote control unit, which is described in more detail later.

As shown in FIG. 4, the electronic apparatus 100 according to another embodiment of the present invention may also comprise a charging unit 140 for charging the remote control unit. For example, in some embodiments, when the connection state between the electronic apparatus 100 and the remote control unit is power connection on state, the electronic apparatus 100 can charge the remote control unit through the charging unit 140. The charging unit 140 can adopt various kinds of charging means, including but not limited to contact type charging (wire cable type, interface type or contact type charging), non-contact type charging (wireless charging), and so on. For example, the charging unit 140 may also use various kinds of charging interfaces, which may include but may not be limited to USB interface for charging, POGO PIN for charging, and so on. It is noted that any other suitable charging means or charging interfaces can be applied to the charging unit 140 of the electronic apparatus 100.

In some embodiments, when the connection state of the electronic apparatus 100 with the remote control unit is power connection off state, the charging unit 140 can stop the charging to the remote control unit.

The electronic apparatus according to the embodiment of the present invention can be any electronic apparatus suitable for being controlled by the remote control unit, which may include but may not be limited to a computer, television set, set-top box, cable TV integrator, player, domestic server, projector, and so on.

Although the schematic structure of the electronic apparatus 100 according to the embodiments of the present invention is described with reference to FIGS. 3 and 4, it is noted that the electronic apparatus according to the embodiment of the present invention can have various kinds of different embodied forms, but not limited to the electronic apparatus specifically described in the schematic implementation here. Therefore, other components can be added to the described electronic apparatus instead of the existing components in the electronic apparatus, or one or more components can be removed therefrom. For example, the electronic apparatus can only comprise a connection state acquiring unit and a mode switching unit, or it can further comprise a functional module needed by other applications on the basis of the shown components, such as, when the electronic apparatus receives information provided by the network service provider (for example, the weather information push-pulled or the like), it may further comprise a network interface for receiving information from network. Further, the electronic apparatus may also use an integrated unit, for example, the functions of the connection state acquiring unit and the mode switching unit are integrated by one processing unit. Those skilled in the art should understand that other feasible implementations should belong to the range covered by the general concept of the embodiments of the present invention.

Figure 5:
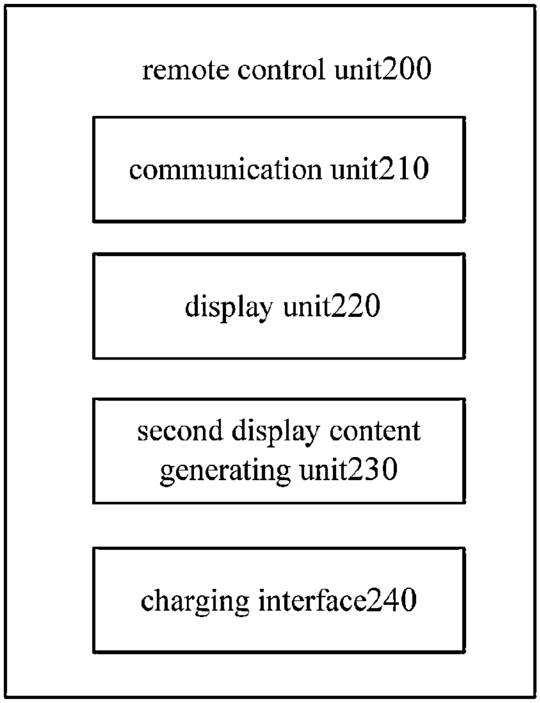
FIG. 5 is a block diagram illustrating the exemplary structure of the remote control unit according to the embodiment of the present invention.

The schematic structure of the remote control unit according to the embodiment of the present invention is described with reference to FIG. 5 now. FIG. 5 is a block diagram illustrating the exemplary structure of the remote control unit according to the embodiment of the present invention. As shown in FIG. 5, the remote control unit 200 comprises a communication unit 210 and a display unit 220. The communication unit 210 is for communicating with the electronic apparatus 100 to implement the interaction between the remote control unit 200 and the electronic apparatus 100. For example, the communication unit 210 can be used to receive a display content generated by the first display content generating unit 130 of the electronic apparatus 100 and displayed through the display unit 220. Or, the communication unit 210 can send the corresponding remote-control command to the electronic apparatus 100 as the controlled apparatus according to user's operation.

As shown in FIG. 5, the remote control unit 200 according to the embodiment of the present invention may further comprise a second display content generating unit 230 for generating a display content related to the remote control unit 200. For example, the apparatus name, operating information, working mode, remaining energy of the remote control unit 200, and so on. In some embodiments, the display unit 220 can display at least one of the display content generated by the first display content generating unit 130 of the electronic apparatus 100, and the display content generated by the second display content generating unit 230 of the remote control unit 200. In some embodiments, the remote control unit 200 may further comprise a display processing unit (not show), as displaying two parts of display content simultaneously, the display processing unit is for setting the display areas and display the effects of the two parts of display content, respectively, for example, screen-divided display or overlay display or the like.

When, as aforementioned, the electronic apparatus 100 comprises a charging unit 140 for charging the remote control unit 200, the remote control unit 200 according to the embodiment of the present invention may further comprise a charging interface 240 for accepting the charging of the charging unit 140, as illustrated in FIG. 5.

Further, when the remote control unit 200 accepts the charging of the electronic apparatus 100 via the charging interface 240, the second display content generating unit 230 of the remote control unit 200 may further generate charging information related to the charging operation as the display content, for example, charging percentage, remaining charging time or the like, and display on the display unit 220.

The remote control unit according to the embodiment of the present invention may be any remote control device suitable for sending a remote-control command to the controlled apparatus to control the controlled apparatus, which may include but may not be limited to dedicated remote controller, wireless mobile apparatus (mobile phone/intelligent terminal/portable terminal having a remote control function), or the like.

Although the schematic structure of the remote control unit 200 according to the embodiments of the present invention is described with reference to FIG. 5, it is noted that the remote control unit according to the embodiment of the present invention can have various kinds of different embodied forms, and it is not limited to the remote control unit specifically described in the exemplary implementation here. Therefore, other components can be added to the described remote control unit instead of the existing components in the remote control unit, or one or more components are removed therefrom. For example, when the connection state detecting unit for detecting the connection state between the electronic apparatus and the remote control unit is arranged in the remote control unit, the remote control unit may further comprise a connection state detecting unit (not show) for detecting the connection state between the electronic apparatus and the remote control unit, and notifying the detection result to the electronic apparatus through, for example, the communication unit. On the other hand, the remote control unit may not comprise the charging interface, even not comprise the display unit. Therefore, the structure described here is just schematical, those skilled in the art should understand that these and other feasible implementations should also belong to the range covered by the general concept of the embodiments of the present invention.

Figure 6:
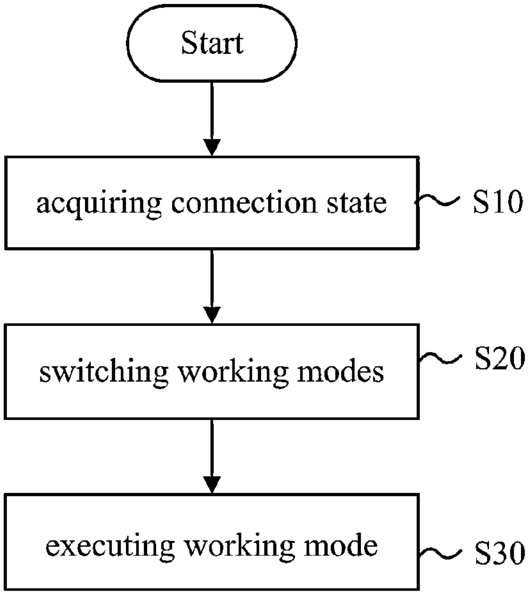
FIG. 6 is a flow chart illustrating the exemplary operating method of the electronic apparatus according to the embodiment of the present invention.

The schematic operation of the electronic apparatus according to the embodiment of the present invention is described with reference to FIG. 6 now. FIG. 6 is a flow chart illustrating the exemplary operating method of the electronic apparatus according to the embodiment of the present invention.

In step S10, the connection relationship between the electronic apparatus 100 and the remote control unit 200 is acquired. The connection relationship can be detected at the electronic apparatus 100 or at the remote control unit 200. When the connection relationship between the electronic apparatus 100 and the remote control unit 200 is detected at the remote control unit 200, the remote control unit 200 can notify the detection result to the electronic apparatus 100. If the connection relationship between the electronic apparatus 100 and the remote control unit 200 is detected at a third party other than the electronic apparatus 100 and the remote control unit 200, the connection relationship is acquired from the third party. In some embodiments, the detecting operation to the connection state can be carried out in real-time, so as to minimize the response time of the system. On the other hand, the connection detecting unit can also carry out the detecting operation periodically. In other words, for example, the connection state detecting unit can carry out the detection of the connection state between the electronic apparatus and the remote control unit at every predetermined time to determine whether the connection state changes. Other ways and means for detecting the connection relationship can be applied in the embodiment of the present invention.

At step S20, the working modes of the electronic apparatus 100 are switched according to the acquired connection state between the electronic apparatus 100 and the remote control unit 200. When the connection relationship is a first connection relationship, the working mode of the electronic apparatus 100 is switched to a first working mode, when the connection relationship is a second connection relationship, the working mode of the electronic apparatus 100 is switched to a second working mode. The correspondence between the connection relationship and the working mode of the electronic apparatus 100 can be for example preset by the user, or set by for example the manufacturer when the electronic apparatus 100 is manufactured.

At step S30, the operation of the electronic apparatus 100 is carried out in the switched working mode. After the working mode of the electronic apparatus 100 is determined and switched, the electronic apparatus 100 carries out the operation related to the working mode in the current working mode. The operation may comprise for example generating the display content related to the working mode of the electronic apparatus 100 and sending the generated display content from the electronic apparatus 100 to the remote control unit 200. For example, when the electronic apparatus 100 is switched to the first working mode, the display content related to the first working mode is generated, when the electronic apparatus 100 is switched to the second working mode, the display content related to the second working mode is generated. These displayed contents may comprise at least one of the system operation state information related to the system operation state of the electronic apparatus 100 as well as the program run state information related to the program running on the electronic apparatus 100. The display content can be displayed by the display unit provided on the remote control unit 200. Further, the operation related to the working mode of the electronic apparatus 100 may also comprise charging the remote control unit 200.

It is noted that the operating method of the example is described with specific steps to be easily understood. However, the steps described here should not be understood as necessary to be executed by the steps or the order as being executed. The operating procedure exemplified here is only an implementation implementing the general concept of the embodiments of the present invention. The logical flow depicted in the figure does not require the shown specific order or sequence to implement an expected result.

In addition to the step procedure show in this figure, other steps can be added, the step exemplified in the flow chart can be replaced by other steps, or one or more steps can be removed from the described flow. Therefore, other implementations should belong to the range covered by the general concept of the embodiments of the present invention.

The above-described method according to the general concept of the disclosure can be implemented in hardware or computer code or software that can be stored in storage medium such as CD-ROM, RAM, floppy disk, hard disk or magneto-optical disc or downloaded through network, so that the method described here can be executed by such software using general purpose computer or dedicated processor, or the method described here can be executed in programmable or dedicated hardware such as ASIC or FPGA. As understood by those skilled in the art, the computer, processor or programmable hardware comprises a storage component (for example, RAM, ROM, flash or the like) that can store or receive software or computer code implementing the processing method described here as being accessed and executed by the computer, processor, or hardware.

In some embodiments, the connection detecting unit for detecting the connection state between the electronic apparatus and the remote control unit can be located at the electronic apparatus, the remote control unit, or the third party other than the electronic apparatus and the remote control unit, and it can use various kinds of suitable detect means to detect the connection relationship between the electronic apparatus and the remote control unit, which may include but may not be limited to detect electric connection, optical connection, magnetic connection, mechanical connection, and so on.

In some embodiments, the correspondence between the various kinds of connection state and the various kinds of working modes of the electronic apparatus depending on the connection means and connection states can be set, the connection states between the electronic apparatus and the remote control unit includes but is not limited to at least one of the following: power connection on, power connection off, data connection on, data connection off, wire connection on, wire connection off, wireless connection on, wireless connection off, and so on.

In some embodiments, the charging unit of the electronic apparatus can adopt various kinds of charging means to charge the remote control unit, they include but are not limited to contact type charging (wire cable type, interface type or contact type charging), non-contact type charging (wireless charging) or the like; and use of various kinds of charging interfaces, including but not limited to USB interface for charging, POGO PIN for charging, or the like.

In some embodiments, the electronic apparatus of the general concept according to the embodiment of the present invention includes but is not limited to computer, television set, set-top box, cable TV integrator, player, domestic server, projector, and so on.

In some embodiments, the remote control unit of the general concept according to the embodiment of the present invention includes but is not limited to dedicated remote controller, wireless mobile apparatus (mobile phone/Intelligent Terminal/portable terminal having a remote control function), or the like.

The general concept of the disclosure proposes electronic apparatus and operating method thereof, wherein, the working modes of the electronic apparatus are switched according to the connection state between the electronic apparatus and the remote control unit. Thereby, it improves the efficiency and convenience degree of user remotely controlling the electronic apparatus.

Although the present invention is shown and described with reference to specific exemplary embodiment of the present invention, those skilled in the art should understand that various modifications on form and detail can be made without departing from the spirit and scope of the present invention defined by the appended claims. Thus, the scope of the present invention is not limited by the detailed description of the present invention and is defined by the appended claims, and all of the differences within this scope should be regarded as being included in the present invention.

What is claimed is:

1. An electronic device having at least two working modes, the electronic device comprising:

- a connection state acquiring unit for acquiring the connection state between the electronic device and the remote control unit, the remote control unit remotely controlling the electronic device;
- a mode switching unit for switching the working modes of the electronic device according to the connected state
- a first display content generating unit for generating a display content related to the working mode of the electronic device, displaying the same through a display unit of the remote control unit, the display content comprises at least one of system operation state information of the electronic device and program run state information of the electronic device; and
- a charging unit for charging the remote control unit, wherein when the electronic device is switched to a first working mode, the charging unit charges the remote control unit.

2. The device of claim 1, wherein the connection state acquiring unit is a connection state detecting unit for detecting the connection state between the electronic device and the remote control unit.

3. The device of claim 1, wherein the connection state acquiring unit is a connection state receiving unit for receiving the connection state between the electronic device and the remote control unit.

4. The device of claim 1, wherein the mode switching unit is for switching the working mode of the electronic device to a first working mode when the connection state is a first connection state and switching the working mode of the electronic device to a second working mode when the connection state is a second connection state.

5. The device of claim 1, wherein the connection state comprises at least one of the following: power connection on, power connection off, data connection on, data connection off, wire connection on, wire connection off, wireless connection on, and wireless connection off.

6. The device of claim 1, wherein the remote control unit comprises:

- a display unit;
- a second display content generating unit for generating a display content related to the remote control unit;
- a charging interface for accepting the charging of the charging unit; and
- a communication unit for carrying out data communication with the electronic device,
- wherein the display unit displays at least one of the display content generated by the first display content generating unit and the display content generated by the second display content generating unit.

7. An operating method of an electronic device, comprising:

- acquiring the connection state between the electronic device and the remote control unit, wherein, the remote control unit is for remotely controlling the electronic device; and
- switching working modes of the electronic device according to the connected state
- generating a display content related to the working mode of the electronic device, displaying the same through a display unit of the remote control unit, the display content comprises at least one of system operation state information of the electronic device and program run state information of the electronic device; and
- charging the remote control unit, wherein when the electronic device is switched to a first working mode, the charging unit charges the remote control unit.

8. The method of claim 7, wherein, the step of acquiring the connection state comprises detecting the connection state between the electronic device and the remote control unit.

9. The method of claim 7, wherein, the step of acquiring the connection state comprises receiving the connection state between the electronic device and the remote control unit.

10. The method of claim 7, wherein, the step of switching the working modes of the electronic device according to the connection state comprises:

- switching the working mode of the electronic device to a first working mode when the connection state is a first connection state; and
- switching the working mode of the electronic device to a second working mode when the connection state is a second connection state.

* * * * *

UNITED STATES PATENT AND TRADEMARK OFFICE

CERTIFICATE OF CORRECTION

PATENT NO. : 8,957,765 B2
APPLICATION NO. : 13/814910
DATED : February 17, 2015
INVENTOR(S) : Xiaobing Guo et al.

It is certified that error appears in the above-identified patent and that said Letters Patent is hereby corrected as shown below:

In the Claims,

- Please delete the word “and” in line 6 of Claim 7
- Please add the punctuation “;” at the end of line 8 of Claim 7

Signed and Sealed this
Fifteenth Day of March, 2016

Michelle K. Lee
*Director of the United States Patent and Trademark Office*